(No Model.)
M. E. & C. C. BLOOD.
CUT-OFF SAWING MACHINE.
No. 479,049. Patented July 19, 1892.
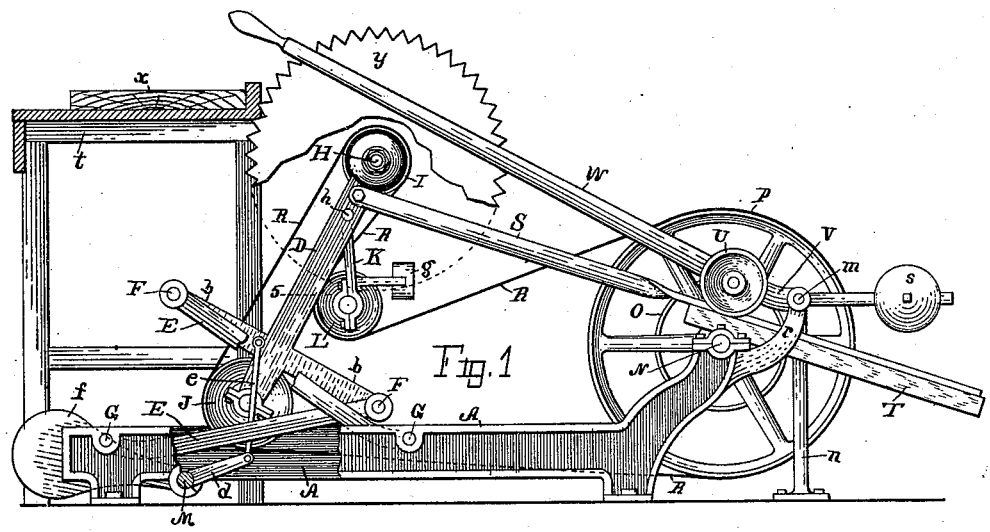
Fig. 1
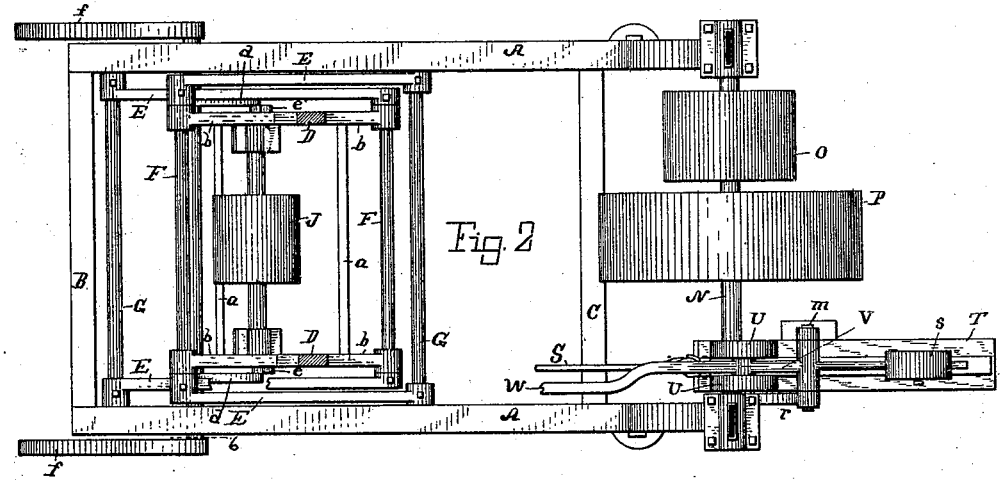
Fig. 2
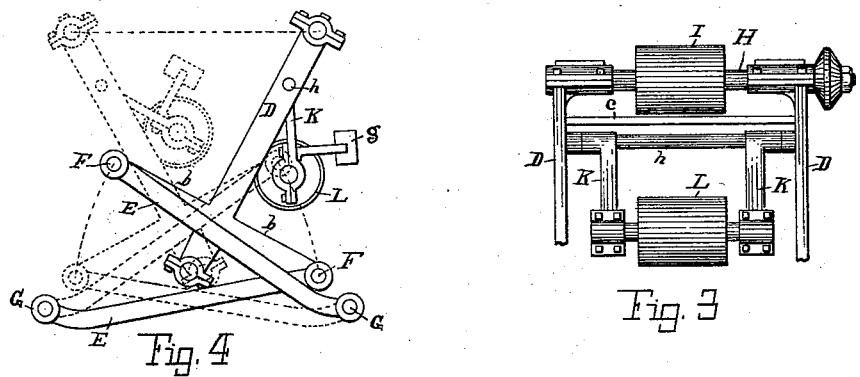
Fig. 4
Fig. 3
Witnesses:
Walter S. Wood
Lou M. Blood
Inventors
Maurice E. Blood
Clarence C. Blood

UNITED STATES PATENT OFFICE.

MAURICE E. BLOOD, OF KALAMAZOO, AND CLARENCE C. BLOOD, OF PETOSKEY, ASSIGNORS OF ONE-HALF TO ORVILLE T. BLOOD, OF PETOSKEY, AND THE FULLER BROTHERS MANUFACTURING COMPANY, OF KALAMAZOO, MICHIGAN.

CUT-OFF SAWING-MACHINE.

SPECIFICATION forming part of Letters Patent No. 479,049, dated July 19, 1892.

Application filed November 19, 1890. Serial No. 371,968. (No model.)

*To all whom it may concern:*

Be it known that we, MAURICE E. BLOOD, residing at Kalamazoo, in the county of Kalamazoo, Michigan, and CLARENCE C. BLOOD, residing at Petoskey, county of Emmet, State of Michigan, citizens of the United States, have invented new and useful Improvements in Cut-Off Sawing-Machines, of which the following is a full description, reference being had to the accompanying drawings, in which—

Figure 1 is a side elevation with a portion of the framework broken out, showing the saw and other parts in the position they occupy before moving forward to make the cut; Fig. 2, a top view with the saw, upper part of the swinging saw-frame, and tightener removed; Fig. 3, the saw-arbor and pulley, upper part of the swinging saw-frame, and tightener; and Fig. 4 is a side elevation of the swinging saw-frame and pivoting-arms, the straight lines showing the position before the sawing is done and the dotted lines showing the position after the saw has passed through the cut.

This invention relates to that kind of cut-off sawing-machines in which the piece to be sawed remains still while the saw moves forward to do the cutting. Such saws are usually made like a railway-saw to slide on planed ways, or the saw-frame is pivoted to swing forward and backward. The objections to the railway-saws are that they are expensive to make, hard to move forward and backward on account of the friction, and not easily belted up; while the disadvantage of the swinging saws in that the saw-arbor describes a circle in its movement forward and backward, not being able to cut the same thickness throughout its whole movement, and if the frame is long to make the saw travel in a straight line it takes up too much room and makes it difficult to hold the saw from moving sidewise and varying the length of piece cut.

The object of this invention is to provide a machine that will embrace as many of the good features and as few of the poor ones that are in both of the machines just described as possible. This we accomplish by making a short saw-frame to swing or rock forward and backward on pivoted bearings, but having the pivoted arms and points arranged in such a manner that the saw and saw-arbor will be moved forward and backward in practically a straight line.

The several devices used and their arrangement and relations to each other are hereinafter described, and specifically pointed out in the claims.

In the drawings similar letters refer to similar parts throughout the several views.

The main frame A A is made of cast-iron or any other suitable material in a square form having two long sides, one cross-piece B, and one center cross-piece C. It is made flat and to lie down close to the floor, having suitable legs or feet coming down to the floor to support itself and the rest of the machine. The rear ends of the side pieces are made to curve upward and have formed on their ends boxes suitable for the bearings for the counter-shaft.

The swinging frame D D is formed of a single casting comprising the sides made in the form of an inverted cross joined together by two cross-pieces $a$ $a$, connecting the arms $b$ $b$ $b$ $b$ together, and a cross-piece $c$, joining the upper part of the frame together. This frame is pivotally supported on the upper ends of the pivot-arms E E E E, which arms are connected to the outer ends of cross-arms $b$ $b$ $b$ $b$ of the swinging frame by means of the rods or shafts F F, which pass through holes in the upper ends of the pivot-arms and outer ends of the cross-arms, making a hinge of them, the rods or shafts F F lying horizontally and running clear across the swinging frame D D. These pivot-arms E E E E are pivoted at their lower ends in the sides of the main frame A A by means of the rods or shafts G G, passing through holes in their lower ends and the sides of the main frame A A, forming a hinge at that point similar to the one at the upper ends of the pivot-arms. The rods or shafts G G also lie horizontally and pass through the main frame A A of the machine from one side to the other. By pivoting and supporting the swinging frame D D in this manner it leaves it free to swing or rock forward and backward, and when it is properly constructed and proportioned and the pivot-points in the right relation to each other the upper ends of the swinging frame D D at a point where the saw-arbor is carried will travel in a straight line or nearly straight line forward and backward when the frame swings on its pivot-points. The saw-arbor H runs across the upper part of the swinging frame D D, having suitable bearings on each side of the frame to allow it to revolve. It carries a saw on its outer left-hand end and has a pulley I on the center between the bearings. On the lower end of the swinging frame D D is an idler-pulley J, secured to a shaft which runs in bearings on each side of the swinging frame. Near the top and between the sides of the swinging frame D D and pivoted to it to swing forward and backward and travel with the swinging frame D D is the tightener-frame K K, carrying the tightener-pulley L, which pulley is mounted on a shaft which runs in bearings at the lower end of the tightener-frame nearly under the saw-arbor pulley. The rock-shaft M runs across the forward end of the main frame A A, having suitable bearings in the lower part of the frame.

Just inside of the main frame A A on each side the rock-shaft has secured to it the arms d d, which extend back under the swinging frame D D and are connected to the lower part of the swinging frame on each side of the frame by means of two connecting links or pitmen e e. On the outer ends of the rock-shaft are secured the counter-weights f f, which extend forward in an opposite direction from the arms d d, their weight having a tendency to throw the arms d d up, and thereby push up the swinging frame D D through the connecting-links e e, and these connecting-links, being connected to the swinging frame a little forward of the center of the frame, will cause the frame to tip over backward as far as the pivot-arms E E E E allow it to go. The counter-shaft N runs in bearings on the rear part of the main frame A A and has mounted upon it the pulley O, by which it is driven, and pulley P, which drives the saw-arbor through the belt R. The tightener-pulley L runs on the top side of the belt and the weight g assists in holding the pulley down against the belt. The idler J runs on the inside of the lower part of the belt, as shown in Fig. 1. The feed-bar S is connected to the swinging frame D D on one side near the upper part or saw by means of a stud or cap screw, which passes through a hole in the front of the bar and screws into the swinging frame. This feed-bar extends backward over the counter-shaft and has bolted on its under side a piece of wood T, which rides on top of the counter-shaft. The wood is made long enough to remain on the shaft without running off at either end during the forward-and-backward movement of the swinging saw-frame. The wheels U U are made to run on top of the wood T and over the counter-shaft to press the wood against the counter-shaft and cause the friction of the counter-shaft against the wood to push the wood and bar S forward, and thereby push the swinging frame D D and saw forward to make the cut. The wheels U U run on the side of the lever-casting V. One or two wheels can be used, as desired, to press down on the friction-block T. The lever-casting V is pivoted at the rear of the wheels U U on a pin m and the pin m is supported at one end by the standard n, which is bolted to the floor, and at the other end by the arm r, which projects from the rear part of the main frame A. The lever W is secured to the front end of the lever-casting V and the forward end reaches up over the saw-table within reach of the operator of the machine. The weight s on the rear part of the lever-casting V is for lifting the lever W and wheels U U from the friction-block T, so that they will not bear down on the friction-block and wear it out unnecessarily when the saw is not in the cut.

In Fig. 1 an end view is shown of a table t and a board or plank x on the top of it to show their relation to the saw y when the saw is at its rearward position.

The operation is as follows: The board or piece of wood to be cut is placed upon the sawing-table, as shown in Fig. 1. When it is in the right position to be cut, the operator pulls down on the lever W, which presses the wheels U U down upon the friction-block T and that friction-block down upon the counter-shaft. Then as the counter-shaft runs toward the saw on its upper side the friction against the friction-block T will force that block and the bar S forward fast or slow, according to the way the operator pulls down on the lever. The bar S forces the swinging frame D D to rock or swing over forward on the pivoting-arms E E E E. The upper ends of the two pivoting-arms E E, that support the front part of the swinging saw-frame D D, will be moving downward at the same rate of speed that the two pivoting-arms that support the rear part of the swinging frame will be moving upward. The swinging frame D D is carried centrally between these two points in such a manner that it will carry the saw forward in nearly, if not quite, a straight line. The operator will pull down on the lever until the saw has passed through the piece to be cut, and then, releasing the lever, the counter-weights f f will cause the swinging frame D D to tip backward to its rearward position, where the saw will be out of the way for moving the piece to be cut forward for the next cut.

The arrangement of the idler-pulley J and tightener-pulley L on the swinging frame D D with the counter-shaft pulley P is such as to allow a uniform length of belt in any of the positions taken by the swinging frame when it moves forward and backward, so that a single belt only is needed to run from the counter-shaft pulley P to the saw-arbor pulley I, as shown in Fig. 1. It will be observed in the position shown in Fig. 1 that the tightener-frame K K hangs nearly straight down, and consequently much of its weight and that of the weight g will come on the pivoting-shaft h, on which it hangs, and press lightly on the belt in that position when the saw is not in the cut, and it is not necessary to have a tight belt; but when the swinging frame D D leans over in the forward position, as shown by the dotted lines in Fig. 4, the tightener-frame K K, keeping the same relative position to the swinging frame will then stand out in more of a horizontal position, and consequently its weight and that of the weight g will be borne more by the belt, and therefore the belt will be tighter in that position and during the cutting than when the saw is not cutting; or, in other words, the tension on the belt by the tightener will be constantly increased as the saw advances in the cut. This will aid greatly in preventing the belt from slipping and the saw from lagging as the saw advances in the cut, but will leave the belt looser, and so it will be easier on the journals of the pulley-shafting when the saw is not cutting.

What we claim, and desire to secure by Letters Patent, is—

1. In a cut-off sawing-machine, a swinging or rocking frame carrying the saw-arbor H in its upper part and an idler-pulley J in its lower part, the said rocking frame being pivoted at its four lower corners to the upper end of four arms E E E E, the said arms E E crossing each other at the sides of the said rocking frame and being pivoted at the lower ends to the main or stationary frame of the machine, substantially as and for the purposes specified.

2. In a cut-off sawing-machine, a swinging or rocking frame for carrying the saw, and the location and arrangement on said rocking frame of the saw-arbor H, idler-pulley J, and the pivot points or bearings on the four lower corners for hinging the supports, in combination with suitable supports having a yielding action hinged to the said pivot-points on the lower corners of the said frame, substantially as and for the purposes specified.

3. In a cut-off sawing-machine, the swinging frame that carries the saw-arbor made of side pieces in the form of an inverted cross, the outer ends of these cross-arms pivoted to the upper ends of arms or supports, which arms or supports cross each other at the sides of the swinging frame and are pivoted at their lower ends to the main frame of the machine, all the parts arranged in such a manner as to carry the saw-arbor forward and backward in a straight or nearly straight line, substantially as and for the purposes specified.

4. A cut-off sawing-machine having a rocking or swinging frame to carry the saw-arbor and the swinging frame supported on the pivoted arms E E E E, in combination with a counter-weight f, rock-shaft M, having an arm d, and a connecting-link e for balancing the swinging frame and throwing it backward, substantially as and for the purposes specified.

5. In a cut-off sawing-machine, a swinging or rocking frame pivoted on the upper ends of four arms E E E E, which arms are each pivoted to the main frame A at their lower ends, the said swinging or rocking frame carrying on its upper part the saw-arbor and also carrying a tightener-pulley L, which is on a frame K, pivoted to the said swinging or rocking frame, substantially as and for the purposes specified.

MAURICE E. BLOOD.
CLARENCE C. BLOOD.

Witnesses to the signature of Maurice E. Blood:
FRANK D. FULLER,
J. F. COWGILL.

Witnesses to the signature of Clarence C. Blood:
P. B. WACHTEL,
Q. C. BARNUM.